(12) United States Patent
Segawa et al.

(10) Patent No.: US 12,484,743 B2
(45) Date of Patent: *Dec. 2, 2025

(54) CLEANING WIPER BLADE

(71) Applicant: CANON KABUSHIKI KAISHA, Tokyo (JP)

(72) Inventors: Shota Segawa, Shizuoka (JP); Takehiko Aoyama, Shizuoka (JP); Masanori Yokoyama, Shizuoka (JP); Hidekazu Matsuda, Shizuoka (JP); Syoji Inoue, Shizuoka (JP); Arihiro Yamamoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

This patent is subject to a terminal disclaimer.

(21) Appl. No.: 18/158,608

(22) Filed: Jan. 24, 2023

(65) Prior Publication Data

US 2023/0157492 A1 May 25, 2023

Related U.S. Application Data

(63) Continuation of application No. PCT/JP2021/028334, filed on Jul. 30, 2021.

(30) Foreign Application Priority Data

Jul. 31, 2020 (JP) .................................. 2020-130703
Jul. 7, 2021 (JP) .................................. 2021-112662

(51) Int. Cl.
*A47L 1/06* (2006.01)
*B60S 1/38* (2006.01)
(Continued)

(52) U.S. Cl.
CPC . *A47L 1/06* (2013.01); *B60S 1/38* (2013.01); *C08G 18/10* (2013.01);
(Continued)

(58) Field of Classification Search
CPC ......... B60S 1/38; C08G 18/10; C08G 18/163; C08G 18/1816; C08G 18/225;
(Continued)

(56) References Cited

U.S. PATENT DOCUMENTS

| 4,622,712 A | 11/1986 | Sugita et al. |
| 4,719,247 A | 1/1988 | Lin et al. |

(Continued)

FOREIGN PATENT DOCUMENTS

| CN | 116057096 | 5/2023 |
| CN | 116057096 A | 5/2023 |

(Continued)

OTHER PUBLICATIONS

Non-final Office Action in U.S. Appl. No. 18/158,633 (Feb. 2025).

(Continued)

*Primary Examiner* — Michael L Leonard
(74) *Attorney, Agent, or Firm* — Venable LLP (57) ABSTRACT

A cleaning wiper blade comprises a hand grip part and an elastic part. The elastic part comprises a polyurethane. The polyurethane comprises a reactant of a composition including an isocyanate compound which includes diisocyanate and polyfunctional isocyanate, and an alcohol which includes polyfunctional alcohol. The diisocyanate has an aromatic ring in a molecule. When a molecule of the polyurethane is ionized with a mass spectrometer of a direct sample injection system, then obtained M1, M2 and M3 satisfy the is 0.013 to 0.300, and a concentration of the polyfunctional alcohol in the polyurethane is 0.12 mmol/g to 0.65 mmol/g.

5 Claims, 6 Drawing Sheets (51) Int. Cl.
*C08G 18/10* (2006.01)
*C08G 18/42* (2006.01)
*C08G 18/48* (2006.01)
*C08G 18/72* (2006.01)
*C08G 18/76* (2006.01)
*C08G 18/77* (2006.01)

(52) U.S. Cl.
CPC ..... *C08G 18/4238* (2013.01); *C08G 18/4854* (2013.01); *C08G 18/721* (2013.01); *C08G 18/7614* (2013.01); *C08G 18/7642* (2013.01); *C08G 18/7671* (2013.01); *C08G 18/7678* (2013.01); *C08G 18/776* (2013.01)

(58) Field of Classification Search
CPC ............ C08G 18/3206; C08G 18/7664; C08G 18/7671; C08L 75/04
See application file for complete search history.

(56) References Cited

U.S. PATENT DOCUMENTS

| | | | | |
|---|---|---|---|---|
| 6,002,911 | A * | 12/1999 | Suzuki | C08G 18/10 528/80 |
| 9,632,474 | B2 | 4/2017 | Yamamoto et al. | |
| 9,996,047 | B2 | 6/2018 | Kawakami et al. | |
| 10,088,795 | B2 | 10/2018 | Ikeda et al. | |
| 10,274,890 | B2 | 4/2019 | Kimura et al. | |
| 10,705,477 | B1 * | 7/2020 | Tano | C08G 18/3206 |
| 2006/0004174 | A1 | 1/2006 | Omori et al. | |
| 2006/0229425 | A1 * | 10/2006 | Inoue | C08G 18/10 528/44 |
| 2017/0068206 | A1 | 3/2017 | Tano et al. | |
| 2019/0150602 | A1 | 5/2019 | Hamilton | |
| 2022/0291622 | A1 | 9/2022 | Yamamoto et al. | |
| 2023/0159692 | A1 | 5/2023 | Segawa et al. | |

FOREIGN PATENT DOCUMENTS

| | | | |
|---|---|---|---|
| EP | 622709 A2 * | 4/1994 | ............ G03G 21/00 |
| JP | 8-44264 A | 2/1996 | |
| JP | 2001-51573 A | 2/2001 | |
| JP | 2004-51894 A | 2/2004 | |
| JP | 2005-91835 A | 4/2005 | |
| JP | 2011-31527 A | 2/2011 | |
| JP | 2017-16125 A | 1/2017 | |
| JP | 2019-82586 A | 5/2019 | |
| JP | 2019-115471 A | 7/2019 | |
| WO | 2017/111060 A1 | 6/2017 | |
| WO | WO 2017/111060 | 12/2017 | |
| WO | 2022/025246 A1 | 2/2022 | |
| WO | 2022/025262 A1 | 2/2022 | |
| WO | 2022/025267 A1 | 2/2022 | |
| WO | 2022/025273 A1 | 2/2022 | |

OTHER PUBLICATIONS

First Office Action in Chinese Application No. 202180058127.7 (Apr. 2025).
International Search Report in International Application No. PCT/JP2021/028334 (Sep. 2021).
U.S. Appl. No. 18/158,628, filed Jan. 24, 2023, Aoyama et al.
U.S. Appl. No. 18/158,617, filed Jan. 24, 2023, Aoyama et al.
U.S. Appl. No. 18/158,633, filed Jan. 24, 2023, Segawa et al.
Extended European Search Report in European Application No. 21848587.8 (Aug. 2024).

* cited by examiner

CLEANING WIPER BLADE

CROSS-REFERENCE TO RELATED APPLICATION

This is a continuation of International Application No. PCT/JP2021/028334, filed on Jul. 30, 2021, and designated the U.S., and claims priority from Japanese Patent Application No. 2020-130703 filed on Jul. 31, 2020, and Japanese Patent Application No. 2021-112662 filed on Jul. 7, 2021, the entire contents of which are incorporated herein by reference.

BACK GROUND OF THE INVENTION

Field of the Invention

The present disclosure relates to a cleaning wiper blade for cleaning the surface of a to-be-cleaned member.

BACKGROUND ART

As a cleaning tool of the to-be-cleaned surface such as a glass surface, there is a cleaning tool having a cleaning part and a grip part which can be gripped by a cleaning worker as disclosed in Japanese Patent Application Publication No. 2019-115471.

SUMMARY OF THE INVENTION

At least one aspect of the present disclosure is directed to providing a cleaning wiper blade which is less likely to cause wiping unevenness, and can exhibit excellent wipability even when pressing against the to-be-cleaned surface is not strengthened.

According to at least one aspect of the present disclosure, there is provided
a cleaning wiper blade comprising:
a hand grip part; and
an elastic part supported by the hand grip part, and to be pressed against a to-be-cleaned surface,
a part of the elastic part being brought into contact with a surface of a to-be-cleaned member, and thereby the surface of the to-be-cleaned member being cleaned,
the elastic part comprises polyurethane,
the polyurethane comprising a reactant of a composition including an isocyanate compound and an alcohol, the isocyanate compound including diisocyanate and tri- or higher functional polyfunctional isocyanate, and the alcohol including tri- or higher functional polyfunctional alcohol,
the diisocyanate having an aromatic ring in a molecule, and,
when the polyurethane is heated up to 1000° C. at a temperature rise rate of 10° C./s using a mass spectrometer of a direct sample injection system in which a sample is heated and vaporized in an ionization chamber, and a molecule of the sample is ionized, then obtained
a detected amount of all ions is defined as M1,
an integrated intensity of a peak in an extracted ion thermogram corresponding to a range of an m/z value derived from the tri- or higher functional polyfunctional isocyanate is defines as M2, and
an integrated intensity of a peak of an extracted ion thermogram corresponding to a range of an m/z value derived from diisocyanate is defined as M3,
M2/M1 is 0.001 to 0.028,
M3/M1 is 0.020 to 0.110,
M2/M3 is 0.013 to 0.300, and
a concentration of the tri- or higher functional polyfunctional alcohol in the polyurethane is 0.12 mmol/g to 0.65 mmol/g.

Further features of the present invention will become apparent from the following description of exemplary embodiments with reference to the attached drawings.

DESCRIPTION OF THE EMBODIMENTS

In the present disclosure, the description "from XX to YY" or "XX to YY" indicative of the numerical value range means the numerical value range including the lower limit and the upper limit of the endpoints unless otherwise specified. When the numerical value range is described in stages, the upper limit and the lower limit of each numerical value range can be combined arbitrarily.

As for a conventional wiper blade, when pressing against the to-be-cleaned surface is weak, wiping unevenness tends to occur. Whereas, when the to-be-cleaned surface is pressed with a strong force, the contact part with the to-be-cleaned member tends to be disturbed. In an extraordinary case, a so-called vibration is caused, which may result in the occurrence of the wiping unevenness. Particularly, for window glass in buildings and showrooms, such as those facing a street, stain with a strong attachment force such as fine particles included in the exhaust gas of a car, dust or an oil film of asphalt, or the like is deposited on the glass surface, which cannot be wiped out with ease. As a result, wiping unevenness may become extraordinary. The present inventors considered that, with a conventional wiper blade made of polyurethane, a difference is caused in how the force is transmitted to the to-be-cleaned member between the hard segment and the soft segment in polyurethane, resulting in the occurrence of, for example, streak-shaped unwiped portions. A further study based on such consideration provided findings that it is effective for a still further improvement of the wipability that the elastic part of the wiper blade comprises specific polyurethane. The specific polyurethane suppresses the aggregation of the hard segments. As a result, conceivably, the transmission of the force to the to-be-cleaned surface becomes uniform in the longitudinal (width) direction of the wiper blade, and the occurring of the streak-shaped unwiped portions can be effectively suppressed.

<Configuration of Wiper Blade>

A cleaning wiper blade in accordance with one aspect of the present disclosure (which will be hereinafter also referred to simply as a wiper blade) comprises a grip part 1 gripped by a hand, i.e. a hand grip part, and an elastic part 2 supported by the hand grip part, and pressed against the to-be-cleaned surface as shown in FIG. 1. The wiper blade comes in contact at a part of the elastic part thereof with the surface of the to-be-cleaned member, and cleans the surface of the to-be-cleaned member.

FIG. 1 shows one example a schematic view of the wiper blade. FIG. 1A shows that the hand grip part 1 and the elastic part 2 are included. However, as shown in FIG. 1B, a support part 3 for supporting the elastic part 1 may be included between the hand grip part 1 and the elastic part 2.

Figure 1A:
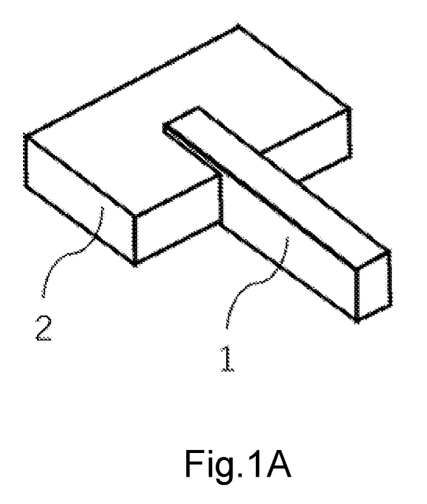
FIGS. 1A, 1B, 1C, and 1D are each one example of the schematic view of a wiper blade.
Figure 1B:
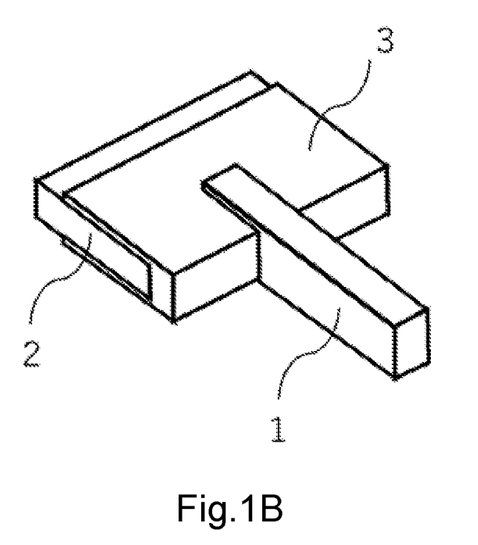
Figure 1C:
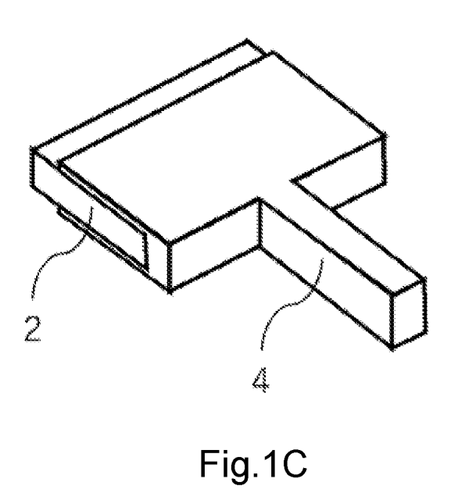

Alternatively, for example, as shown in FIG. 1C, it may have a support grip part 4 in which the support part and the hand grip part are integrated.

Figure 1D:
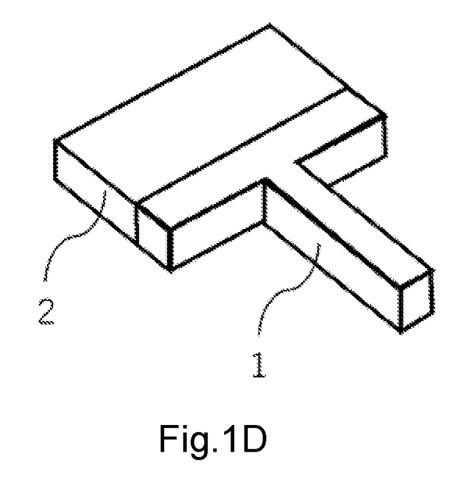

As shown in FIG. 1D, the elastic part and the hand grip part may be integral with each other.

The hand grip part 1, the support part 3, and the elastic part 2 may be detachable or integrated with one another.

Figure 2A:
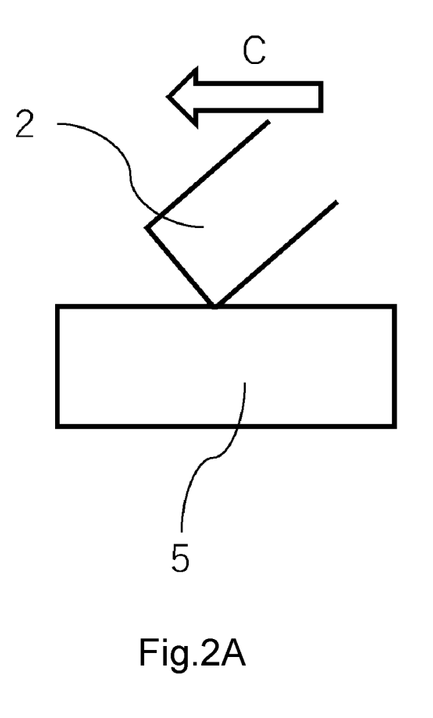
FIGS. 2A and 2B are each an explanatory view showing the state during the cleaning process of a wiper blade.
Figure 2B:
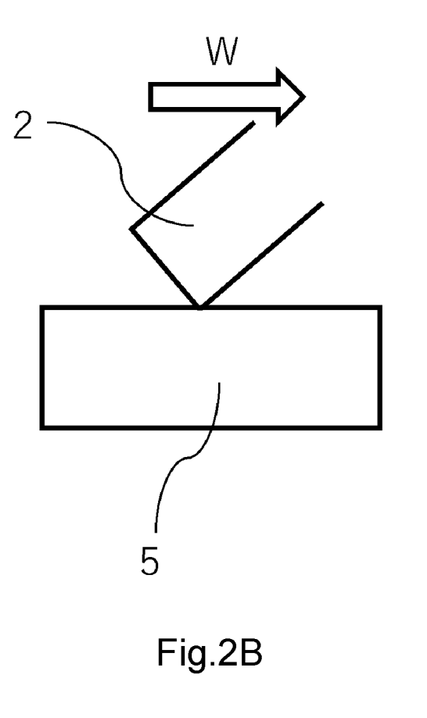

FIGS. 2A and 2B are explanatory views showing the state of the process in which the elastic part 2 of the wiper blade comes in contact with the to-be-cleaned member 5, and is slid for cleaning. As shown in FIGS. 2A and 2B, the wiper blade can be used in the pushing direction C so as to move from the hand grip part 1 toward the elastic part 2 as well as in the pulling direction W.

Figure 3:
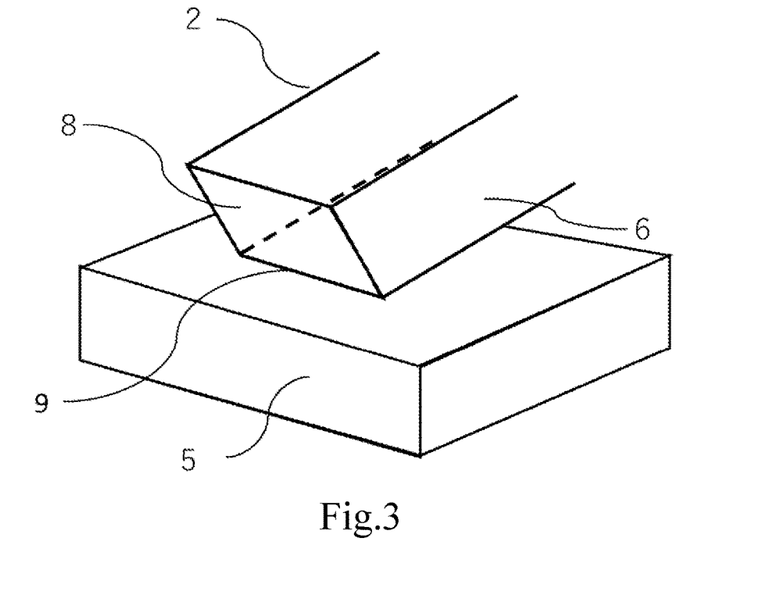
FIG. 3 is an enlarged schematic view of the contact part between the elastic part of the wiper blade and the to-be-cleaned member.

FIG. 3 is an enlarged schematic view of the contact part between the elastic part 2 and the to-be-cleaned member 5.

As shown in FIG. 3, when the side farthest from the hand grip part of the elastic part is defined as the tip side of the wiper blade, the elastic part 2 has, on the tip side, a main surface 6 opposed to the to-be-cleaned member 5, and a tip surface 8 forming a tip side edge 9 with the main surface 6.

With the main surface 6 and the tip surface 8, for the elastic part 2, the tip side edge 9 extending in the longitudinal direction is formed.

As described above, it is considered as follows: for a conventional wiper blade made of polyurethane, a difference is caused in how the force is transmitted to the to-be-cleaned member between the hard segment and the soft segment in polyurethane, resulting in the occurrence of streak-shaped unwiped portions.

The cause thereof was presumed as follows. It is considered as follows: for polyurethane for use in a conventional wiper blade, aggregation of the hard segment proceeds, so that the hard segments gather in clumps. As a result, at a microscopic polymer level, there occurs a state in which the difference in hardness between the hard segment and the soft segment is remarkably caused, namely a state in which there is hardness unevenness.

It is considered that when the wiper blade is brought into contact with the to-be-cleaned member in this state, strong contact force portions and weak contact force portions appear irregularly; accordingly, in the process of cleaning (wiping off operation), streak-shaped unwiped portions occur.

Therefore, it was considered that the hard segments in polyurethane are dispersed finely and uniformly, thereby resolving the hardness unevenness. Departing from the consideration, the composition of polyurethane is set as a specific condition. This enables fine and uniform dispersion of the hard segments in polyurethane. As a result, it was possible to still further improve the wipability of the to-be-cleaned member.

The elastic part of the present disclosure comprises polyurethane, the polyurethane comprises a reactant of a composition including an isocyanate compound which includes diisocyanate and tri- or higher functional polyfunctional isocyanate, and an alcohol which includes tri- or higher functional polyfunctional alcohol, and the diisocyanate having an aromatic ring in a molecule. Further, when the polyurethane is heated up to 1000° C. at a temperature rise rate of 10° C./s using a mass spectrometer of a direct sample injection system in which a sample is heated and vaporized in an ionization chamber, and a molecule of the sample is ionized, then obtained a detected amount of all ions is defined as M1, an integrated intensity of a peak in an extracted ion thermogram corresponding to a range of an m/z value derived from the tri- or higher functional polyfunctional isocyanate is defined as M2, and an integrated intensity of a peak of an extracted ion thermogram corresponding to a range of an m/z value derived from diisocyanate is defined as M3, M2/M1 is 0.001 to 0.028, M3/M1 is 0.020 to 0.110, M2/M3 is 0.013 to 0.300, and a concentration of the tri- or higher functional polyfunctional alcohol in the polyurethane is 0.12 mmol/g to 0.65 mmol/g.

Below, a detailed description will be given.

The hard segment is mainly formed by aggregation by the interaction between urethane bonds or the interaction between the aromatic rings of diisocyanate. The hard segments tend to become larger when they can regularly overlap one another. Accordingly, by disturbing the regularity, it is possible to achieve the miniaturization of the hard segment.

Accordingly, as described above, by achieving the composition including tri- or higher functional polyfunctional isocyanate, and tri- or higher functional polyfunctional alcohol within a proper concentration ratio, the orientation is suppressed by steric hindrance. As a result, the hard segments become less likely to be aggregated. For this reason, the hard segments are miniaturized, and are uniformly dispersed.

As a result, in the entire region in the longitudinal direction of the elastic part, the contact force of the contact region with the to-be-cleaned member is uniformalized. Accordingly, the contact part can be movable uniformly on the surface of the to-be-cleaned member. For this reason, in the entire region in the longitudinal direction of the wiper blade, excellent wipability not causing wipe-off unevenness can be exhibited.

When the M2/M1 is 0.001 or more, the structure derived from tri- or higher functional polyfunctional isocyanate with low crystallinity is introduced to polyisocyanate forming the hard segment, which can suppress the aggregation of the hard segments. This can disperse the hard segments finely and uniformly.

When the M2/M1 is 0.028 or less, the aggregation between low-molecular-weight polyfunctional components can be suppressed, which can suppress the aggregation of the hard segments. Whereas, in the case of 0.015 or less, the aggregation can be suppressed at a higher level.

When the M3/M1 is 0.020 or more, in the curing reaction, a higher molecular weight tends to be achieved, so that the wear resistance can be improved. Further, 0.040 or more is preferable.

Since the higher the concentration of diisocyanate is, the more, the aggregation of the hard segments progresses, M3/M1 is 0.110 or less. By setting M3/M1 at 0.110 or less, the aggregation of the hard segments can be more suppressed. Further, 0.100 or less is preferable.

When the M2/M3 is 0.013 or more, sufficient tri- or higher functional polyfunctional isocyanate is present for diisocyanate, and hence crystallization by diisocyanate is suppressed. This can suppress the aggregation of the hard segments.

On the other hand, when the M2/M3 is 0.300 or less, the aggregation between low-molecular-weight polyfunctional components can be suppressed, which can suppress the aggregation of the hard segments. Whereas, in the case of 0.150 or less, the aggregation can be suppressed at a higher level.

Additionally, it is preferable that,
the M2/M1 is 0.001 to 0.015,
the M3/M1 is 0.040 to 0.100,
the M2/M3 is 0.013 to 0.150, and
the concentration of the tri- or higher functional polyfunctional alcohol in the polyurethane is 0.22 mmol/g to 0.39 mmol/g.

The concentration of the tri- or higher functional polyfunctional alcohol in polyurethane is calculated by the following equation (1). When the concentration of the tri- or higher functional polyfunctional alcohol falls within the foregoing range, the hard segment aggregation suppressing effect is high. Namely, the concentration of the tri- or higher functional polyfunctional alcohol in polyurethane is 0.12 mmol/g to 0.65 mmol/g, and is preferably 0.22 mmol/g to 0.39 mmol/g.

concentration of tri- or higher functional polyfunctional alcohol (mmol/g)=[tri- or higher functional polyfunctional alcohol amount (g)/tri- or higher functional polyfunctional alcohol molecular weight×1000]/[polyurethane mass (g)]   Equation (1):

The polyurethane is preferably a polyurethane elastomer.

The polyurethane elastomer can be obtained from raw materials mainly including polyol, a chain extender, polyisocyanate, a catalyst, other additives, and the like.

The polyurethane elastomer is a block copolymer comprising hard segments and soft segments. The hard segment generally comprises polyisocyanate and a chain extender comprising a short chain diol. On the other hand, the soft segment generally comprises long chain polyol such as polyester polyol, polyether polyol, polycarbonate polyol, and polyisocyanate.

As the polyisocyanate, diisocyanate and tri- or higher functional polyfunctional isocyanate are used in combination.

Examples of diisocyanate may include the following.

4,4'-Diphenylmethane diisocyanate (4,4'-MDI), 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), tetramethyl xylene diisocyanate (TMXDI), and carbodiimide modified MDI.

As diisocyanate, the one having an aromatic ring in the molecule is used. Use of the diisocyanate including an aromatic ring can provide favorable mechanical characteristics and a high reactivity.

Diisocyanate preferably has a structure in which NCO is directly bonded to the aromatic ring. As a result of this, the aggregation of the hard segments can be more suppressed, and still more fine dispersion thereof is possible.

Examples of the tri- or higher functional polyfunctional isocyanate may include the following.

Polymeric MDI, triphenyl methane-4,4',4''-triisocyanate (TTI), tris(phenyl isocyanate)thiophosphate (TPTI), 4-isocyanate methyl-1,8-octamethylene diisocyanate, 1,3,6-hexamethylene triisocyanate, trimethyl benzene triisocyanate, diphenylmethane-2,4-4'-triisocyanate.

The tri- or higher functional polyfunctional isocyanate is more preferably at least one selected from the group consisting of polymeric MDI, triphenyl methane-4,4',4''-triisocyanate, and tris(phenyl isocyanate)thiophosphate.

The tri- or higher functional polyfunctional isocyanate is preferably at least one selected from the group consisting of polymeric MDI and tris(phenyl isocyanate)thiophosphate. The isocyanate has a methylene group or an ether between NCO's. For this reason, the distance between the urethane bonds can be kept properly. For this reason, this is preferable for suppressing the aggregation of the hard segments.

The polymeric MDI is expressed by the following chemical formula (1) and chemical formula (1)'.

The n in the chemical formula (1)' is preferably from 1 to 4.

The chemical formula (1) indicates the case where n is 1 in the chemical formula (1)'.

(1)

(1)'

The branch by tri- or higher functional polyfunctional alcohol can suppress crystallization, and can suppress the aggregation of the hard segments.

On the other hand, when the branches are too many, the density of the urethane bonds in the periphery of the tri- or higher functional polyfunctional alcohol increases, so that the hard segments tend to become more likely to be aggregated. For this reason, out of tri- or higher functional polyfunctional alcohols, tri-functional alcohol is preferably used.

Out of these, the alcohols represented by the following formula (a) or (b) are preferable, as they have a methylene group adjacent to a hydroxy group, which allows the distance between the urethane bonds to be properly maintained.

Specific examples of the tri- or higher functional polyfunctional alcohol may include trimethylol ethane (the one of the following formula (a) where $R_1$ is $CH_3$), trimethylolpropane (TMP: the one of the following formula (a) where $R_1$ is $C_2H_5$), glycerin, pentaerythritol, and sorbitol.

The tri- or higher functional polyfunctional alcohol is preferably at least one selected from the group consisting of the alcohols represented by the following formulae (a) and (b), and glycerin and pentaerythritol.

The tri- or higher functional polyfunctional alcohols can be used singly alone, or in combination of two or more thereof.

In the formulae (a) and (b), $R_1$ and $R_2$ each independently represent H, $CH_3$, or $C_2H_5$.

Examples of the polyol may include the following.

Polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol, and (polyethylene/polyneopentylene) adipate polyester polyol; polycaprolactone type polyol obtained from ring opening polymerization of caprolactone; polyether polyols such as polyethylene glycol, polypropylene glycol, and polytetramethylene glycol; and polycarbonate diol. These can be used singly alone, or in combination of two or more thereof.

Out of the polyols, polyester polyol using adipate is preferable because a polyurethane elastomer excellent in mechanical characteristics can be obtained.

Particularly, the one having an alkylene group with 4 or more carbon atoms such as polybutylene adipate polyester polyol or polyhexylene adipate polyester polyol is preferable. Further, polyols with the alkylene groups having different numbers of carbon atoms such as polybutylene adipate polyester polyol and polyhexylene adipate polyester polyol are preferably used in combination. Use of the different kinds of polyols can also improve the crystallization suppression of the soft segments, so that the soft segments become less likely to gather. As a result, the dispersibility of the hard segments can be more improved.

As the chain extenders, diol which is capable of extending a polyurethane elastomer chain, and tri- or higher functional polyfunctional alcohols can be used.

Examples of diol may include the following.

Ethylene glycol (EG), diethylene glycol (DEG), propylene glycol (PG), dipropylene glycol (DPG), 1,4-butane diol (1,4-BD), 1,6-hexane diol (1,6-HD), 1,4-cyclohexane diol, 1,4-cyclohexane dimethanol, and xylylene glycol (terephthalyl alcohol), and triethylene glycol. These can be used singly alone, or in combination of two or more thereof.

As the catalyst, a polyurethane elastomer curing catalyst for common use can be used. Examples thereof may include a tertiary amine catalyst. Specific examples thereof may include the following. Amino alcohols such as dimethyl ethanolamine, N,N,N'-trimethylamino propyl ethanolamine and N,N'-dimethyl hexanolamine; trialkyl amine such as triethyl amine; tetraalkyl diamine such as N,N,N'N'-tetramethyl-1,3-butane diamine; and triethylene diamine, a piperazine type compound, and a triazine type compound. Further, an organic acid salt of an alkali metal such as potassium acetate or potassium octanoate can also be used.

Further, a metal catalyst to be commonly used for urethanization, for example, dibutyltin dilaurate is also usable. These can be used singly alone, or in combination of two or more thereof.

To the raw materials forming the elastic part, if required, the additives such as a pigment, a plasticizer, a waterproofing agent, an antioxidant, an ultraviolet absorber, and a light stabilizer can be mixed.

<Manufacturing Method of Wiper Blade>

The manufacturing method of a wiper blade has no particular restriction, and can be selected from among known methods.

For example, in a mold for a wiper blade, for example a polyurethane elastomer raw material composition is injected into the cavity, and is heated and cured. As a result, the elastic part can be obtained.

Alternatively, at the tip part of the elastic part, cutting may be performed, thereby forming the shape. By doing so, the smoothness of the tip edge can be formed high.

Still alternatively, the following is also acceptable: a pair of molded bodies in a tandem shape formed in contact with each other so that the tip surfaces of the elastic part are opposed to each other are manufactured, and are cut in the longitudinal direction, thereby manufacturing a cleaning wiper blade.

<Cleaning Wiper Blade Configuration>

The wiper blade comprises a hand grip part 1, and an elastic part 2 supported by the hand grip part 1, and to be pressed against the to-be-cleaned surface. The wiper blade may have a support part 3 of the portion positioned between the elastic part 2 and the hand grip part 1, and for supporting the elastic part 2.

The hand grip part 1 is the portion which can be gripped or held by a cleaning work main body typified by a hand.

As shown in FIG. 1A or 1B, the hand grip part 1 is connected with the elastic part directly, or via the support part 3. Incidentally, the hand grip part 1 may be detachable or integrated with the elastic part 2 or the support part 3.

Further, the hand grip part 1 may be detachable with the elastic part 2 or the support part 3. The hand grip part 1 extends in the direction crossing with direction of extension of the elastic part 2. Incidentally, the hand grip part 1 has no particular restriction on the shape so long as it can be gripped or held by a cleaning work main body. A jig serving as an assistance to cleaning may be connected with the hand grip part.

For example, mention may be made of a jig for elongating the hand grip part for cleaning a high place, or the like. Incidentally, the material for the hand grip part 1 has no particular restriction, and may be made of a resin, or may be made of a metal.

As shown in FIG. 1B, the support part 3 is the portion positioned between the elastic part 2 and the hand grip part 1, and for supporting the elastic part 2.

The wiper blade has no support part 3, and the elastic part 2 may be directly coupled with the hand grip part 1 as shown in FIG. 1A. However, the wiper blade preferably has the support part in order to stabilize the elastic part, and to bring the elastic part into contact with the to-be-cleaned member.

The support part 3 is connected with the elastic part 2 in the direction orthogonal to the direction of extension of the elastic part 2. Incidentally, the elastic part 2 may be detachable from or integrated with the support part 3. Incidentally, the support part 3 has no particular restriction on the shape so long as it can support the elastic part 2.

For example, the support part 3 may be in a shape sandwiching a part of the elastic part 2 therein. The material for the support part 3 has no particular restriction, and may be made of a resin, or may be made of a metal.

<Use Method of Wiper Blade>

The use method of the wiper blade will be described.

The cleaning work main body holds the support grip part 4, and moves the wiper blade in the direction crossing with the direction of extension of the elastic part 2 while pressing the elastic part 2 against the surface of the to-be-cleaned member, and thereby removes stain.

FIGS. 2A and 2B shows an explanatory view of a state of the process in which for cleaning, the wiper blade comes in contact with the to-be-cleaned member, and is slid for cleaning.

The direction of movement of the wiper blade is the direction crossing with the direction of extension of the elastic part 2. The wiper blade can be used by being moved in the pushing direction C shown in FIG. 2A and the pulling direction W shown in FIG. 2B.

Further, the stain may be previously wetted by a liquid cleaner, water, or the like, thereby to be removed together with the liquid cleaner, water, or the like.

<Shape of Wiper Blade>

For the wiper blade, respective shapes and mounting methods of the elastic part 2, the support part 3, and the support grip part 4 have no restriction.

Further, the method for mounting the support part 3 with respect to the elastic part 2, and the method for mounting the support grip part 4 with respect to the support part 3 also have no restriction.

EXAMPLES

Below, the present disclosure will be described by way of manufacturing examples, Examples, and Comparative Examples. However, the present disclosure is not limited to the Examples, and the like at all.

For other materials than those shown in Examples and Comparative Examples, a reagent or an industrial chemical was used. Incidentally, all the expressions "part(s)" in Examples and Comparative Examples are based on mass unless otherwise specified.

Example 1

<Preparation of Raw Materials for Elastic Part>

The materials in the Table 1 below were mixed, and were allowed to react with each other at a temperature of 80° C. for 3 hours, thereby preparing a prepolymer with a NCO content of 10.6 mass %.

TABLE 1

| Material | Mixing amount (g) |
| --- | --- |
| 4,4'-Diphenylmthane diisocyanate (trade name: MILLIONATE MT manufactured by Tosoh Corporation) (* which will be hereinafter described as "4,4'-MDI, or simply as "MDI") | 200 |
| Polymeric MDI as tri- or more functional multifunctional isocyanate (trade name: MILLIONATE MR-400 manufactured by Tosoh Corporation) (* which will be hereinafter described as "polymeric MDI") | 180 |
| Polybutylene adipate polyester polyol (trade name: NIPPOLAN 3027 manufactured by Tosoh Corporation, number average weight 2500) (* which will be hereinafter described as "PBA 2500") | 620 |

The materials described in Table 2 below were mixed, thereby preparing a curing agent.

TABLE 2

| Material | Mixing amount (g) |
| --- | --- |
| 1,4-Butane diol (manufactured by Tokyo Chemical Industry Co., Ltd.) (* which will be hereinafter described as "1,4-BD") | 21 |
| Trimethylolpropane (manufactured by Tokyo Chemical Industry Co., Ltd.) (* which will be hereinafter described as "TMP") | 58 |
| Polyhexylene adipate polyester polyol (trade name: NIPPOLAN 164, manufactured by Tosoh Corporation, number average molecular weight 1000) (* which will be hereinafter described as "PHA 1000") | 350 |
| N,N'-dimethyl hexanolamine (trade name: KAOLIZER No. 25 manufactured by Kao Corporation) (* which will be hereinafter described as "No. 25") | 0.57 |

The above prepolymer and the above curing agent were mixed, thereby preparing a raw material composition of polyurethane.

The raw material composition was injected into the cavity of a mold for molding the elastic part of the wiper blade, and was cured at a temperature of 130° C. for 2 minutes. Then, demolding was performed, and obtain a polyurethane molded body.

Incidentally, into the cavity of the molding mold, a release agent A was coated prior to injection of the raw material composition.

The release agent A is a mixture of the materials shown in Table 3 below.

TABLE 3

| Material | Mixing amount (g) |
| --- | --- |
| ELEMENT 14 PDMS 1000-JC (trade name, manufactured by Momentive Performance Materials Corporation) | 5.06 |
| ELEMENT 14 PDMS 10K-JC (trade name, manufactured by Momentive Performance Materials Corporation) | 6.19 |
| SR1000 (trade name, manufactured by Momentive Performance Materials Corporation) | 3.75 |
| EXXSOL DSP145/160 (trade name, manufactured by ANDOH PARACHEMIE CO., LTD.) | 85 |

The tip side of the obtained polyurethane molded body was cut, thereby manufacturing an elastic part having a main surface, and a tip surface forming the tip side edge with the main surface. Incidentally, the lengths in the thickness direction and the longitudinal direction of the elastic part were set at 1.8 mm and 300 mm, respectively. The obtained elastic part was subjected to the following evaluations.

[Evaluation 1: Measurement of Size of Hard Segment]

The size of the hard segment was measured using a scanning probe microscope (SPM) in the following manner.

For the scanning probe microscope (SPM), MFP-3D-Origin (Oxford Instruments Co., Ltd.) was used.

The preparation method of a sample, and the like are as follows.

Figure 4:
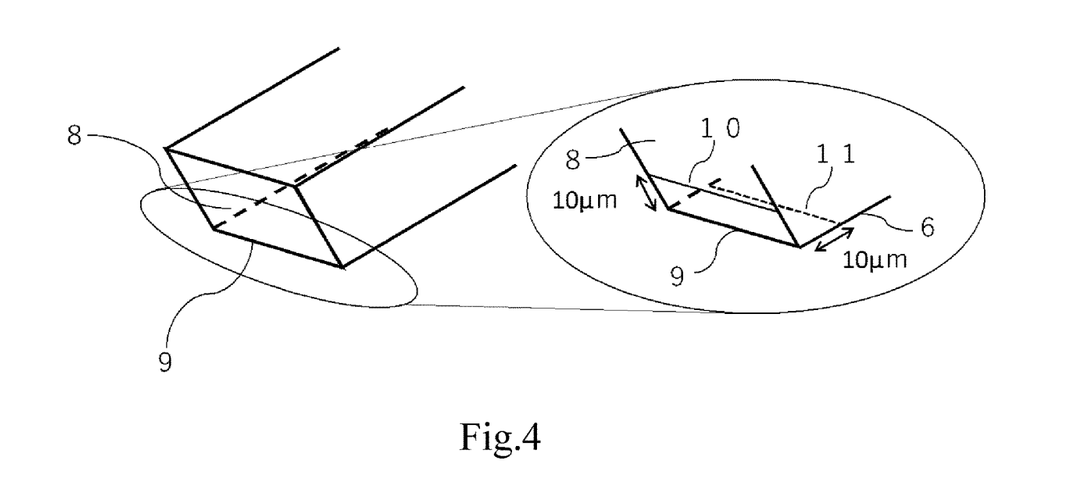
FIG. 4 is an enlarged view of the tip side edge vicinity.

Herein, as a result of detailed observation of the behavior of the wiper blade, when the wiper bade was moved in the pushing direction C in the direction from the hand grip part toward the elastic part (see FIG. 2A), the wiper blade was in contact with the to-be-cleaned surface in the region centering on the position about 10 μm from the tip side edge 9 at the tip surface 8 (see FIG. 4).

Further, when the wiper blade was moved in the pulling direction W (see FIG. 2B), the wiper blade was in contact with the to-be-cleaned surface in the region centering on the position about 10 μm from the tip side edge 9 at the main surface 6 opposed to the to-be-cleaned surface (see FIG. 4).

Figure 5:
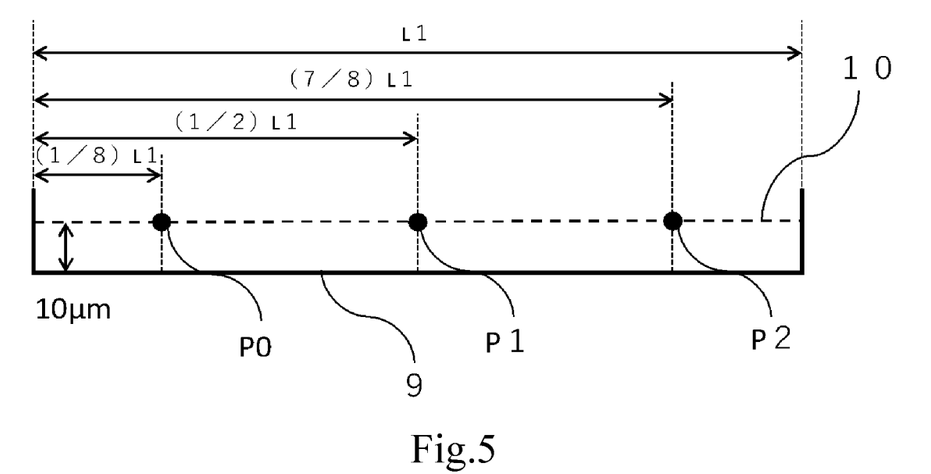
FIG. 5 is an enlarged view of a first line segment vicinity.

Thus, as shown in FIG. 4 (FIG. 4 is an enlarged view of the tip side edge 9 vicinity) and FIG. 5 (FIG. 5 is an enlarged view of the first line segment 10 vicinity), when a first line segment 10 (a second line segment 11 for the main surface) with a distance from the tip side edge 9 of 10 μm, and a length of L1 is assumed to be drawn in parallel with the tip side edge 9 at the tip surface 8 of the elastic part of the resulting wiper blade, three measurement samples of 2 mm squares having centers of gravity at P0, P1, and P2 at points of (⅛) L1, (1/2) L1, and (⅞) L1, respectively, from one end side on the first line segment and with respective one sides in parallel with the first line segment were cut out. Then, from each measurement sample, using a cryomicrotome (UC-6 (trade name), manufactured by Leica Microsystems Co.), polyurethane thin pieces having the centers of gravity at P0, P1, or P2, each of 100 μm square with one side in parallel with the first line segment, and each with a thickness of 1 μm were cut out at −50° C. In this manner, three measurement samples were prepared. Each of the resulting measurement samples was placed on a smooth silicon wafer, and was allowed to stand under environment at room temperature of 25° C. and a humidity of 50% for 24 hours.

Then, the silicon wafer placing the measurement sample thereon was set at a SPM stage, and SPM observation thereof was performed. Incidentally, the spring constant and the proportionality constant of a cantilever made of silicon (trade name: OMCL-AC160, manufactured by Olympus Corporation, tip curvature radius: 8 nm) were previously confirmed to be the following with the thermal noise method mounted on the present SPM device (spring constant: 30.22 nN/nm, proportionality constant: 82.59 nm/V).

Further, previously, tuning of the cantilever was carried out, thereby determining the resonance frequency of the cantilever (285 KHz (primary) and 1.60 MHz higher level)).

The measurement mode of SPM was set at AM-FM mode, the free amplitude of the cantilever, at 3 V (primary) and 25 mV (higher level), and the set point amplitude, at 2 V (primary). In the visual field of a 1 μm×1 μm square, scanning was performed under conditions of a scan rate of 1 Hz, and scan points of 256 vertically and 256 horizontally, thereby acquiring three phase images (256-gradation gray scale). Incidentally, for the visual fields, the positions were selected such that P0, P1, and P2 of each measurement sample were present at the center of the visual field, and each one side was in parallel with the first line segment.

Figure 8A:
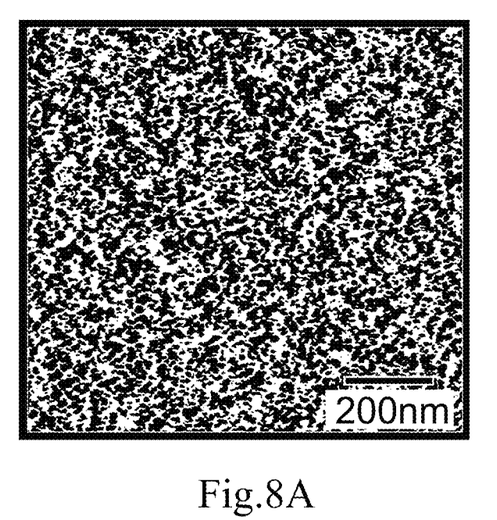
FIGS. 8A and 8B are binarized images of Example 1 and Comparative Example 1.
Figure 8B:
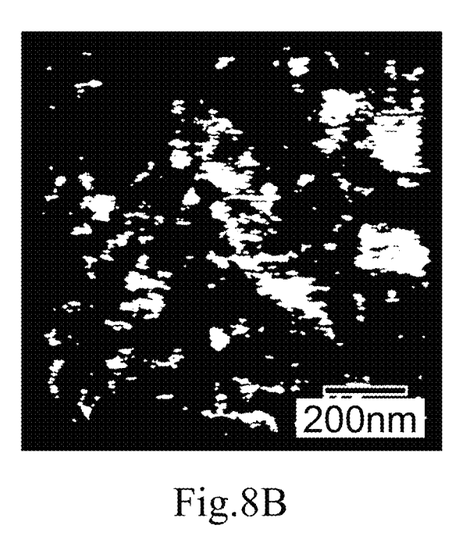

Each of the resulting phase images was subjected to binarization processing using an image processing analysis system (trade name: Luzex-AP, manufactured by NIRECO Corporation). Specifically, the phase image was binarized using the binarization setting function of the image processing analysis system. Incidentally, the threshold value at the binarization setting function was set at 85 (85th on 256 gradation). The operation provided a binarized image in which the soft segment was displayed in black, and the hard segment was displayed in white. As an example, FIG. 8A shows the binarized image of Example 1, and FIG. 8B shows the binarized image of Comparative Example 1.

The size of the hard segment in the resulting binarized image was measured using the image processing analysis system. The size of the hard segment was measured using the "circle-equivalent diameter" parameter.

Further, also for the main surface, three binarized images were formed in the same manner as described above, and the size of the hard segment in each binarized image was measured.

The arithmetic average value of the sizes of all the hard segments measured from a total of six binarized images thus obtained is shown as the size of the hard segment in the present disclosure in Table 4 or Table 5.

[Evaluation 2: Measurement of M1 to M3]

Using the direct sample introduction method (DI method) in which a sample is directly introduced to an ion source without being passed through a gas chromatograph (GC), the measurements of M1 to M3 were performed. As the device, an ion trapping type GC/MS (trade name: POLARIS Q, manufactured by Thermo Fisher Scientific Co.) was used. As a direct introducing probe, a Direct Exposure Probe (DEP) was used.

The 0.1 μg of sample sampled at each of the P0, P1, and P2 (P0, P1, and P2 were also set on the main surface as with the tip surface) of the tip surface and the main surface was fixed at a filament positioned at the tip of the probe, and was directly introduced into an ionization chamber. Subsequently, the sample was rapidly heated from room temperature to 1000° C. at a constant temperature rise rate (about 10° C./s), and the vaporized gas was detected by a mass spectrometer. When the total ion detection amount M1 is assumed to be the sum of the integrated intensities of all the peaks at the resulting total ion current thermogram, and the sum of integrated intensities of the peaks of the extracted ion thermogram of the m/z value derived from tri- or higher functional polyfunctional isocyanate is assumed to be M2, using the values of the M1 and M2, (M2/M1) was calculated. Further, when the sum of the integrated intensities of the peaks of the extracted ion thermogram of the m/z value derived from diisocyanate is assumed to be M3, using the values of the M1 and M3, (M3/M1) was calculated. Then, the arithmetic average values of the numerical values obtained from respective samples of respective P0', P1', and P2' of the tip surface and the main surface were referred to as the values of respective (M2/M1) and (M3/M1) of the tip surface and the main surface.

Herein, in the present Example, for the elastic part comprising polyurethane synthesized using a polymeric MDI as tri- or higher functional polyfunctional isocyanate, there was detected the peak derived from the cationized product of polymeric MDI having peak tops at respective positions in which the m/z value indicating n=1 of the structure represented by the chemical formula (1)' falls within the range of 380.5 to 381.5; the m/z value indicating n=2, within the range of 511.5 to 512.5; the m/z value indicating n=3, within the range of 642.5 to 643.5; and the m/z value indicating n=4, within the range of 773.5 to 774.5 in the extracted ion thermogram obtained by the foregoing analysis. Thus, in the present Example, the sum of the integrated intensities of the respective peaks was referred as M2.

Further, in other Examples described later, TTI used as tri- or higher functional polyfunctional isocyanate has the structure shown in the following chemical formula (2). Then, for the elastic part comprising polyurethane synthesized using TTI, there was detected the peak derived from the cationized product of TTI, having the peak top at the position in which m/z is within the range of 366.5 to 367.5 in the extracted ion thermogram obtained by the analysis.

Therefore, in the present Example, the integrated intensity of the peak was referred to as M2.

(2)

(4a)

(4b)

Similarly, in Example described later, the TPTI used as tri- or higher functional polyfunctional isocyanate has the structure represented by the following chemical formula (3). Then, for the elastic part comprising polyurethane synthesized using TPTI, there was detected the peak derived from the cationized product of TPTI, having a peak top at the position in which m/z is within the range of 464.5 to 465.5 in the extracted ion thermogram obtained by the analysis.

Therefore, in the present Example, the integrated intensity of the peak was referred to as M2.

M-xylylene diisocyanate (XDI) of diisocyanate has the structure represented by the following chemical formula (5). For the elastic part comprising polyurethane synthesized using XDI, there was detected the peak derived from the cationized product of XDI, having a peak top at the position in which m/z is within the range of 187.5 to 188.5 in the extracted ion thermogram obtained by the analysis.

Therefore, the integrated value of the peak was referred to as M3.

(3)

(5)

On the other hand, the 4,4'-MDI used as diisocyanate in the present Example has the structure represented by the following chemical formula (7). For the elastic part comprising polyurethane synthesized using 4,4'-MDI, there was detected the peak derived from the cationized product of 4,4'-MDI, having a peak top at a position in which m/z is 249.5 to 250.5 in the extracted ion thermogram obtained by the analysis.

Thus, the integrated intensity of the peak was referred to as M3.

Further, 1,5-naphthalene diisocyanate (NDI) of diisocyanate has the structure represented by the following chemical formula (6). For the elastic part comprising polyurethane synthesized using NDI, there was detected the peak derived from the cationized product of NDI, having a peak top at the position in which m/z is within the range of 209.5 to 210.5 in the extracted ion thermogram obtained by the analysis.

Therefore, the integrated intensity of the peak was referred to as M3.

(7)

(6)

The toluene diisocyanate (TDI) used as diisocyanate in other Examples has the structures represented by the following chemical formulae (4a) and (4b).

For the elastic part comprising polyurethane synthesized using TDI, there was detected the peak derived from the cationized product of TDI, having a peak top at the position in which m/z is within the range of 173.5 to 174.5 in the extracted ion thermogram obtained by the analysis.

Therefore, the integrated intensity of the peak was referred to as M3.

[Evaluation 3: Polyfunctional Alcohol Kind, Measurement of Concentration]

By pyrolysis GC/MS (gas chromatography and mass spectrometry method), detection of polyfunctional alcohol was performed. The measurement conditions are shown below.

Sampling position: the sample to be sampled at each of the P0, P1, and P2 of the tip surface and the main surface (P0, P1, and P2 are also set for the main surface as with the tip surface) was measured in the following manner. Incidentally, for sampling, the member of polyurethane or the like was cut out by a biocutter.

Device:
Pyrolysis device: trade name: EGA/PY-3030D, manufactured by Frontier Laboratories Ltd.
Gas chromatography device: TRACE1310 gas chromatograph, manufactured by Thermo Fisher Scientific Co.
Mass analyzer: ISQLT, manufactured by Thermo Fisher Scientific Co. Pyrolysis temperature: 500° C.
GC column: internal diameter 0.25 mm×length 30 m stainless steel capillary column
Stationary phase 5% phenyl polydimethyl siloxane
Temperature rising conditions: held at 50° C. for 3 minutes, and raised in temperature to 300° C. at a temperature rise rate of 8° C./min
MS condition: mass number range m/z 10 to 650
scan rate 1 sec/scanning The polyfunctional alcohol kind was qualified with GC/MS. The calibration curve with GC analysis of the known concentration of the qualified polyfunctional alcohol kind was formed, and quantification was performed from the GC peak area ratio. Then, the arithmetic average value of all the measurement values obtained from respective samples at the respective P0, P1, and P2 of the tip surface and the main surface was defined as the concentration of polyfunctional alcohol in the present disclosure. The results are shown in Table 4 and Table 5.

<Evaluation 4: Test of Wiping Performance>

The elastic part of the wiper blade was brought into contact with, and was brought into sliding contact with the top of the glass surface with the reciprocating stroke including pull-back movement, thereby observing the wiping state of stain on the glass surface. As a result, evaluation of the wiping performance of the wiper blade was performed. A schematic view of the tester which performed the evaluation is shown in FIG. 6.

Figure 6:
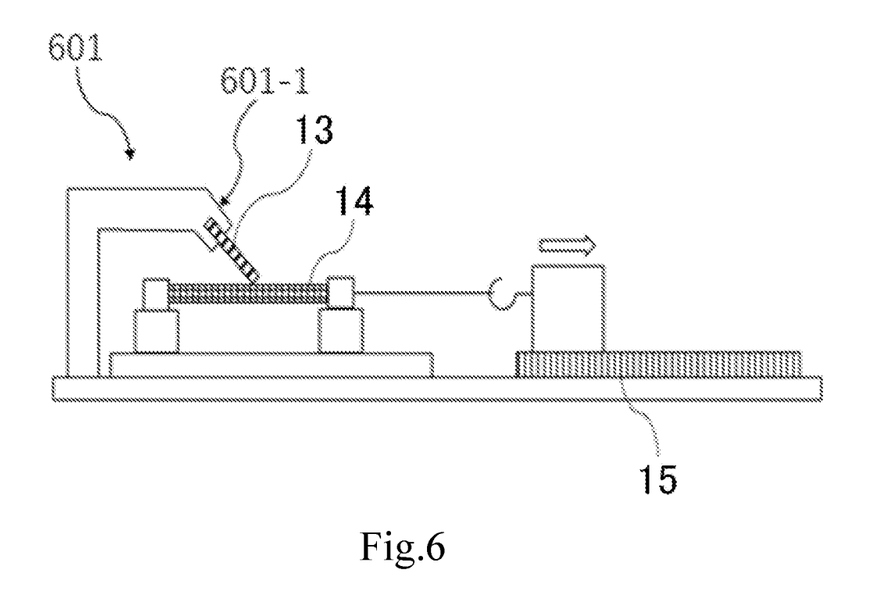
FIG. 6 is a schematic view of a testing apparatus for evaluating the wipability performance of the wiper blade.

With the test, the elastic part 13 of the wiper blade was mounted as shown in FIG. 6. Waterdrops were sprayed in a fog form on the entire surface of the glass sheet 14 of the to-be-cleaned member. Thus, cleaning was performed under the following conditions.

Figure 7:
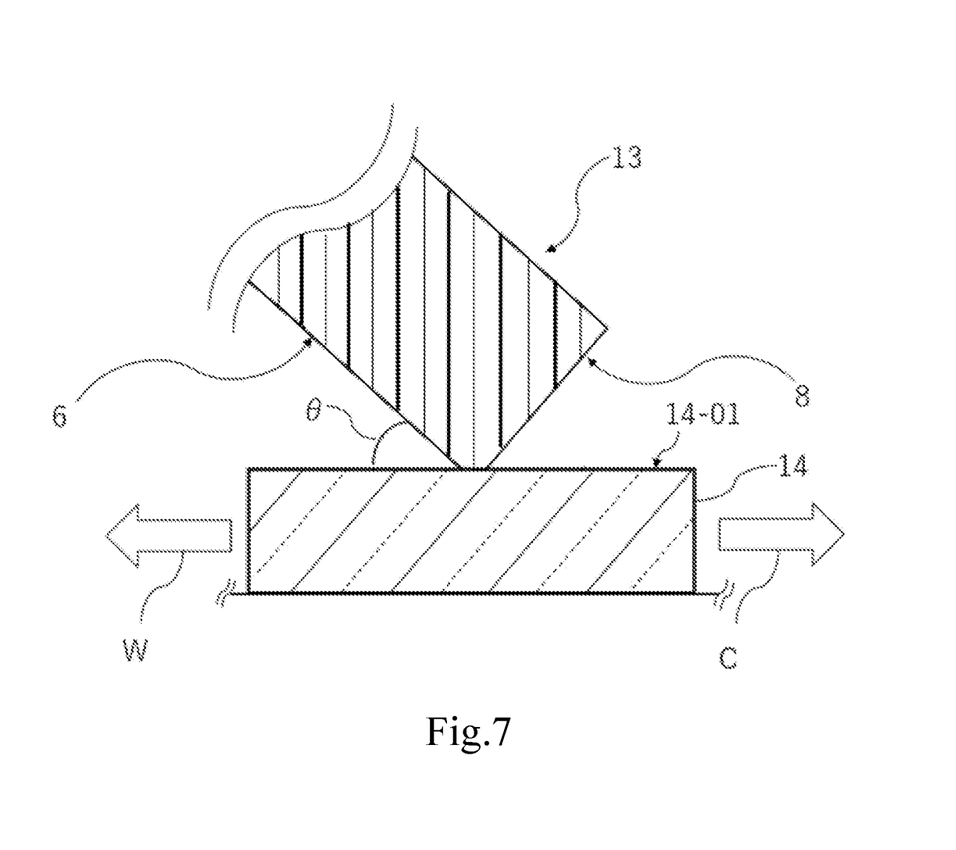
FIG. 7 is an enlarged view of the portion at which the elastic part of the wiper blade and the glass surface are in contact with each other.

The elastic part 13 of the wiper blade was grasped over the overall length in the longitudinal direction thereof by a grasp part 601-1 of an evaluation device 601 shown in FIG. 6. Thus, the wiping performance test of stain on the surface of the glass 14 by the wiper blade was performed. One surface of the glass sheet 14 was entirely wetted with water. Then, the elastic part was brought into contact with the water-wetted surface of the glass sheet 14 (which will also be hereinafter referred to as the "to-be-cleaned surface"). Herein, FIG. 7 shows an enlarged view of the portion at which the elastic part of the wiper blade and the to-be-cleaned surface 14-01 of the glass sheet 14 are in contact with each other. As shown in FIG. 7, the elastic part 13 of the wiper blade was brought into contact therewith so that the angle θ formed between the main surface 6 of the elastic part and the to-be-cleaned surface 14-01 became 45 degrees. Then, the glass sheet 14 was reciprocated in the direction of W and the direction of C indicated with respective arrows in FIG. 7 at a speed of 10 mm/sec using an electric robocylinder (trade name: RCP4-SA5C, manufactured by IAI Co., Ltd.) 15. Incidentally, the force of pressing against the glass surface per a length of 1 m in the longitudinal direction of the elastic part was set at 10 N/m. Then, the state of wiping off water on the to-be-cleaned surface immediately after wiping off was visually observed, and evaluation was performed according to the following criteria.

[Evaluation Criteria]
Rank A: one or less hair line (unwiped portion in a very fine streak with a width of 0.5 mm or less), and 0 heavier line (unwiped portion in a fine streak with a width of 1 mm or less), and wide line (unwiped portion in a band shape with a width up to about 1 to 20 mm, also including a collection of several hair lines and heavier lines, and a thin film-shaped unwiped portion)
Rank B: 2 hair lines, and 0 heavier line and wide line,
Rank C: 2 hair lines, and 1 heavier line, and 0 wide line
Rank D: 3 hair lines, and 1 heavier line, and 0 wide line
Rank E: 4 or more hair lines, or 2 or more heavier lines, or 1 or more wide lines Examples 2 to 48, and Comparative Examples 1 to 6

A prepolymer and a curing agent were obtained in the same manner as in Example 1, except for changing the materials and the amounts for mixing as in Table 4 or Table 5. The resulting wiper blades were evaluated in the same manner as in Example 1.

The details of the material used other than those shown in Example 1 will be shown below.

Polybutylene adipate polyester polyol with a number average molecular weight of 1000 (trade name: NIPPOLAN 4009, manufactured by TOSOH CORPORATION Ltd.) (which will be hereinafter described as PBA 1000)

Polyhexylene adipate polyester polyol with a number average molecular weight of 1000 (trade name: NIPPOLAN 164, manufactured by TOSOH CORPORATION Ltd.) (which will be hereinafter described as PHA 1000)

Polyhexylene adipate polyester polyol with a number average molecular weight of 2600 (trade name: NIPPOLAN 136, manufactured by TOSOH CORPORATION Ltd.) (which will be hereinafter described as PHA 2600)

Polyhexylene adipate polyester polyol with a number average molecular weight of 4500 (trade name: HS2H-451A, manufactured by HOKOKU Corporation) (which will be hereinafter described as PHA 4500)

Polytetramethylene ether glycol with a number average molecular weight of 1000 (trade name: PTG-1000SN, manufactured by Hodogaya Chemical Co., Ltd.) (which will be hereinafter described as PTMG 1000)

Polytetramethylene ether glycol with a number average molecular weight of 2000 (trade name: PTG-2000SN, manufactured by Hodogaya Chemical Co., Ltd. (which will be hereinafter described as PTMG 2000)

Glycerin (manufactured by Tokyo Chemical Industry Co., Ltd.)

Pentaerythritol (manufactured by Tokyo Chemical Industry Co., Ltd.)

Toluene diisocyanate (trade name: CORONATE T-80, manufactured by TOSOH CORPORATION Ltd.) (which will be hereinafter described as TDI)

M-xylylene diisocyanate (product code: D0127, manufactured by Tokyo Chemical Industry Co., Ltd.) (which will be hereinafter described as XDI)

1,5-Naphthalene diisocyanate (product code: NO168, manufactured by Tokyo Chemical Industry Co., Ltd.) (which will be hereinafter described as NDI)

Triphenyl methane-4,4',4"-triisocyanate as the tri- or higher functional polyfunctional isocyanate (trade name: ULTIGHT SUPER CA, manufactured by Toho Kasei Kogyo Co., Ltd) (which will be hereinafter described as TTI)

Tris(phenyl isocyanate)thiophosphate as the tri- or higher functional polyfunctional isocyanate (trade name: ULTIGHT SUPER CAII, manufactured by Toho Kasei Kogyo Co., Ltd) (which will be hereinafter described as TPTI)

The evaluation results of Examples 1 to 48, and Comparative Examples 1 to 6 are shown in Tables 4 and 5.

TABLE 4

| | Composition | | | | | | | | | |
|---|---|---|---|---|---|---|---|---|---|---|
| | Prepolymer | | | | | | Curing agent | | | |
| | Diisocyanate | | Tri- or more functional multifunctional isocyanate | | Polyol | | Low molecular weight diol | | Tri- or more functional multifunctional alcohol | |
| | Type | Mixing amount (g) | Type | Mixing amount (g) | Type | Mixing amount (g) | Type | Mixing amount (g) | Type | Mixing amount (g) |
| Example 1 | MDI | 200 | Polymeric MDI | 180 | PBA2500 | 620 | 1,4-BD | 21 | TMP | 58 |
| Example 2 | MDI | 200 | Polymeric MDI | 100 | PHA4500 | 700 | — | 0 | TMP | 50 |
| Example 3 | MDI | 10 | Polymeric MDI | 290 | PBA2500 | 700 | 1,4-BD | 24 | TMP | 30 |
| Example 4 | MDI | 20 | Polymeric MDI | 930 | PBA1000 | 50 | 1,4-BD | 300 | TMP | 22 |
| Example 5 | MDI | 80 | Polymeric MDI | 820 | PBA1000 | 100 | 1,4-BD | 285 | TMP | 22 |
| Example 6 | MDI | 50 | Polymeric MDI | 910 | PBA1000 | 40 | 1,4-BD | 310 | TMP | 23 |
| Example 7 | MDI | 440 | Polymeric MDI | 60 | PBA1000 | 500 | 1,4-BD | 68 | TMP | 25 |
| Example 8 | MDI | 440 | Polymeric MDI | 60 | PBA1000 | 500 | — | 0 | TMP | 56 |
| Example 9 | MDI | 310 | Polymeric MDI | 90 | PHA4500 | 600 | — | 0 | TMP | 76 |
| Example 10 | MDI | 120 | Polymeric MDI | 280 | PBA2500 | 600 | — | 0 | TMP | 53 |
| Example 11 | MDI | 220 | Polymeric MDI | 530 | PBA1000 | 250 | 1,4-BD | 184 | TMP | 42 |
| Example 12 | MDI | 10 | Polymeric MDI | 405 | PHA4500 | 585 | — | 0 | TMP | 125 |
| Example 13 | MDI | 20 | Polymeric MDI | 930 | PBA1000 | 50 | 1,4-BD | 215 | TMP | 116 |
| Example 14 | MDI | 80 | Polymeric MDI | 820 | PBA1000 | 100 | 1,4-BD | 190 | TMP | 117 |
| Example 15 | MDI | 170 | Polymeric MDI | 730 | PBA1000 | 100 | 1,4-BD | 190 | TMP | 117 |
| Example 16 | MDI | 440 | Polymeric MDI | 60 | PBA2500 | 500 | 1,4-BD | 10 | TMP | 136 |
| Example 17 | MDI | 440 | Polymeric MDI | 60 | PBA2500 | 500 | — | 0 | TMP | 114 |
| Example 18 | MDI | 310 | Polymeric MDI | 90 | PHA4500 | 600 | — | 0 | TMP | 100 |
| Example 19 | MDI | 120 | Polymeric MDI | 280 | PBA2500 | 600 | — | 0 | TMP | 95 |
| Example 20 | MDI | 220 | Polymeric MDI | 530 | PBA1000 | 250 | 1,4-BD | 150 | TMP | 75 |
| Example 21 | MDI | 200 | Polymeric MDI | 180 | PBA2500 | 620 | 1,4-BD | 23 | Glycerin | 40 |
| Example 22 | MDI | 50 | Polymeric MDI | 500 | PBA2500 | 450 | 1,4-BD | 60 | Glycerin | 65 |
| Example 23 | MDI | 200 | Polymeric MDI | 180 | PBA2500 | 620 | 1,4-BD | 9 | Pentaerythritol | 55 |
| Example 24 | MDI | 50 | Polymeric MDI | 500 | PBA2500 | 450 | 1,4-BD | 25 | Pentaerythritol | 100 |
| Example 25 | MDI | 240 | Polymeric MDI | 210 | PTMG1000 | 550 | 1,4-BD | 21 | TMP | 58 |
| Example 26 | MDI | 200 | Polymeric MDI | 180 | PTMG2000 | 620 | 1,4-BD | 21 | TMP | 58 |
| Example 27 | MDI | 200 | Polymeric MDI | 180 | PHA2600 | 620 | 1,4-BD | 21 | TMP | 58 |
| Example 28 | TDI | 122 | Polymeric MDI | 180 | PBA2500 | 698 | 1,4-BD | 21 | TMP | 58 |
| Example 29 | TDI | 30 | Polymeric MDI | 520 | PBA2500 | 450 | 1,4-BD | 72 | TMP | 100 |
| Example 30 | XDI | 135 | Polymeric MDI | 180 | PBA2500 | 685 | 1,4-BD | 21 | TMP | 58 |

| | Composition | | | | | | | SPM | | |
|---|---|---|---|---|---|---|---|---|---|---|
| | Curing agent | | | | | | | | | |
| | Polyol | | Catalyst | | | | | Triol | Average hard | |
| | Type | Mixing amount (g) | Type | Mixing amount (g) | Mass analysis | | | concentration (mmol/g) | segment size (nm) | Evaluation Rank |
| | | | | | M2/M1 | M3/M1 | M2/M3 | | | |
| Example 1 | PHA1000 | 350 | No. 25 | 0.57 | 0.005 | 0.065 | 0.070 | 0.20 | 22 | A |
| Example 2 | PHA4500 | 2150 | No. 25 | 1.28 | 0.001 | 0.024 | 0.047 | 0.12 | 34 | B |
| Example 3 | PHA2600 | 750 | No. 25 | 0.72 | 0.006 | 0.021 | 0.295 | 0.12 | 33 | B |
| Example 4 | PHA1000 | 20 | No. 25 | 0.54 | 0.028 | 0.094 | 0.298 | 0.12 | 38 | B |
| Example 5 | PHA1000 | 40 | No. 25 | 0.54 | 0.023 | 0.098 | 0.235 | 0.12 | 32 | B |
| Example 6 | PHA1000 | 20 | No. 25 | 0.54 | 0.027 | 0.104 | 0.258 | 0.13 | 32 | B |
| Example 7 | PHA1000 | 450 | No. 25 | 0.62 | 0.001 | 0.108 | 0.013 | 0.12 | 35 | B |
| Example 8 | PHA1000 | 870 | No. 25 | 0.77 | 0.001 | 0.087 | 0.013 | 0.22 | 24 | A |
| Example 9 | PHA2600 | 1530 | No. 25 | 1.04 | 0.001 | 0.047 | 0.027 | 0.22 | 28 | A |
| Example 10 | PHA1000 | 750 | No. 25 | 0.72 | 0.006 | 0.042 | 0.134 | 0.22 | 24 | A |
| Example 11 | PHA1000 | 210 | No. 25 | 0.57 | 0.014 | 0.099 | 0.146 | 0.22 | 26 | A |
| Example 12 | PHA4500 | 350 | No. 25 | 0.75 | 0.007 | 0.025 | 0.280 | 0.63 | 33 | B |
| Example 13 | PHA1000 | 20 | No. 25 | 0.54 | 0.028 | 0.095 | 0.295 | 0.64 | 34 | B |
| Example 14 | PHA1000 | 40 | No. 25 | 0.54 | 0.022 | 0.097 | 0.229 | 0.65 | 38 | B |
| Example 15 | PHA1000 | 40 | No. 25 | 0.54 | 0.020 | 0.109 | 0.181 | 0.65 | 39 | B |
| Example 16 | PHA2600 | 410 | No. 25 | 0.62 | 0.001 | 0.107 | 0.013 | 0.65 | 32 | B |

TABLE 4-continued

| | | | | | | | | | | |
|---|---|---|---|---|---|---|---|---|---|---|
| Example 17 | PHA2000 | 1040 | No. 25 | 0.86 | 0.001 | 0.077 | 0.013 | 0.39 | 30 | A |
| Example 18 | PHA4500 | 150 | No. 25 | 1.04 | 0.001 | 0.047 | 0.027 | 0.29 | 27 | A |
| Example 19 | PHA2600 | 710 | No. 25 | 0.72 | 0.006 | 0.042 | 0.134 | 0.39 | 24 | A |
| Example 20 | PHA1000 | 210 | No. 25 | 0.57 | 0.015 | 0.099 | 0.147 | 0.39 | 26 | A |
| Example 21 | PHA1000 | 350 | No. 25 | 0.57 | 0.005 | 0.066 | 0.070 | 0.31 | 25 | A |
| Example 22 | PHA1000 | 250 | No. 25 | 0.55 | 0.013 | 0.055 | 0.239 | 0.51 | 35 | B |
| Example 23 | PHA1000 | 350 | No. 25 | 0.57 | 0.005 | 0.066 | 0.070 | 0.29 | 40 | B |
| Example 24 | PHA1000 | 250 | No. 25 | 0.55 | 0.013 | 0.055 | 0.239 | 0.53 | 48 | C |
| Example 25 | PTMG1000 | 350 | No. 25 | 0.57 | 0.005 | 0.078 | 0.069 | 0.30 | 27 | A |
| Example 26 | PTMG1000 | 350 | No. 25 | 0.57 | 0.005 | 0.065 | 0.070 | 0.30 | 28 | A |
| Example 27 | PBA1000 | 350 | No. 25 | 0.57 | 0.005 | 0.065 | 0.070 | 0.30 | 25 | A |
| Example 28 | PHA1000 | 350 | No. 25 | 0.57 | 0.005 | 0.067 | 0.068 | 0.30 | 28 | A |
| Example 29 | PHA1000 | 400 | No. 25 | 0.63 | 0.012 | 0.065 | 0.185 | 0.47 | 38 | B |
| Example 30 | PHA1000 | 350 | No. 25 | 0.57 | 0.005 | 0.063 | 0.073 | 0.30 | 34 | B |

TABLE 5

| | Composition | | | | | | | | | |
|---|---|---|---|---|---|---|---|---|---|---|
| | Prepolymer | | | | | | Curing agent | | | |
| | Diisocyanate | | Tri- or more functional multifunctional isocyanate | | Polyol | | Low molecular weight diol | | Tri- or more functional multifunctional alcohol | |
| | Type | Mixing amount (g) | Type | Mixing amount (g) | Type | Mixing amount (g) | Type | Mixing mount (g) | Type | Mixing amount (g) |
| Example 31 | XDI | 40 | Polymeric MDI | 520 | PBA2500 | 440 | 1,4-BD | 72 | TMP | 100 |
| Example 32 | NDI | 157 | Polymeric MDI | 180 | PBA2500 | 663 | 1,4-BD | 21 | TMP | 58 |
| Example 33 | NDI | 62 | Polymeric MDI | 520 | PBA2500 | 418 | 1,4-BD | 72 | TMP | 100 |
| Example 34 | MDI | 200 | TTI | 720 | PBA2500 | 620 | 1,4-BD | 21 | TMP | 58 |
| Example 35 | MDI | 250 | TTI | 1400 | PBA2500 | 400 | 1,4-BD | 81 | TMP | 100 |
| Example 36 | MDI | 250 | TTI | 520 | PBA2500 | 620 | 1,4-BD | 7 | Pentaerythritol | 58 |
| Example 37 | MDI | 250 | TTI | 1400 | PBA2500 | 400 | 1,4-BD | 48 | Pentaerythritol | 100 |
| Example 38 | MDI | 200 | TPTI | 720 | PBA2500 | 620 | 1,4-BD | 21 | TMP | 58 |
| Example 39 | MDI | 250 | TPTI | 1400 | PBA2500 | 400 | 1,4-BD | 81 | TMP | 100 |
| Example 40 | MDI | 250 | TPTI | 520 | PBA2500 | 620 | — | 0 | Pentaerythritol | 58 |
| Example 41 | MDI | 250 | TPTI | 1400 | PBA2500 | 400 | 1,4-BD | 28 | Pentaerythritol | 100 |
| Example 42 | XDI | 200 | TTI | 720 | PBA2500 | 620 | 1,4-BD | 21 | Pentaerythritol | 58 |
| Example 43 | XDI | 250 | TTI | 1400 | PBA2500 | 400 | 1,4-BD | 81 | Pentaerythritol | 100 |
| Example 44 | XDI | 135 | Polymeric MDI | 180 | PBA2500 | 685 | 1,4-BD | 21 | Pentaerythritol | 58 |
| Example 45 | XDI | 40 | Polymeric MDI | 520 | PBA2500 | 440 | 1,4-BD | 72 | Pentaerythritol | 100 |
| Example 46 | XDI | 200 | TTI | 720 | PBA2500 | 620 | 1,4-BD | 21 | TMP | 58 |
| Example 47 | XDI | 250 | TTI | 1400 | PBA2500 | 400 | 1,4-BD | 81 | TMP | 100 |
| Example 48 | MDI | 170 | Polymeric MDI | 730 | PBA1000 | 100 | 1,4-BD | 245 | TMP | 60 |
| Comparative Example 1 | MDI | 80 | Polymeric MDI | 220 | PHA4500 | 700 | 1,4-BD | 30 | TMP | 20 |
| Comparative Example 2 | MDI | 440 | Polymeric MDI | 60 | PBA2500 | 500 | 1,4-BD | 10 | TMP | 136 |
| Comparative Example 3 | MDI | 0 | Polymeric MDI | 990 | PBA1000 | 10 | 1,4-BD | 210 | TMP | 140 |
| Comparative Example 4 | MDI | 600 | Polymeric MDI | 0 | PBA1000 | 400 | 1,4-BD | 50 | TMP | 90 |

TABLE 5-continued

| | | | | | | | | | |
|---|---|---|---|---|---|---|---|---|---|
| Comparative Example 5 | MDI | 5 | TTI | 985 | PBA1000 | 10 | 1,4-BD | 250 | TMP | 100 |
| Comparative Example 6 | MDI | 200 | Polymeric MDI | 180 | PBA2500 | 620 | 1,4-BD | 82 | TMP | 0 |

| | Composition Curing agent | | | | | | | SPM | | |
|---|---|---|---|---|---|---|---|---|---|---|
| | Polyol | | Catalyst | | | | | Triol | Average hard | |
| | Type | Mixing amount (g) | Type | Mixing amount (g) | Mass analysis | | | concentration (mmol/g) | segment size (nm) | Evaluation Rank |
| | | | | | M2/M1 | M3/M1 | M2/M3 | | | |
| Example 31 | PHA1000 | 400 | No. 25 | 0.63 | 0.012 | 0.063 | 0.190 | 0.47 | 47 | C |
| Example 32 | PHA1000 | 350 | No. 25 | 0.57 | 0.005 | 0.065 | 0.071 | 0.30 | 24 | A |
| Example 33 | PHA1000 | 400 | No. 25 | 0.63 | 0.012 | 0.063 | 0.192 | 0.47 | 31 | B |
| Example 34 | PHA1000 | 350 | No. 25 | 0.79 | 0.005 | 0.065 | 0.073 | 0.30 | 31 | B |
| Example 35 | PHA1000 | 250 | No. 25 | 0.99 | 0.014 | 0.063 | 0.214 | 0.52 | 45 | C |
| Example 36 | PHA1000 | 350 | No. 25 | 0.72 | 0.005 | 0.064 | 0.080 | 0.30 | 41 | C |
| Example 37 | PHA1000 | 250 | No. 25 | 0.98 | 0.014 | 0.065 | 0.214 | 0.53 | 65 | D |
| Example 38 | PHA1000 | 350 | No. 25 | 0.79 | 0.004 | 0.065 | 0.061 | 0.30 | 30 | A |
| Example 39 | PHA1000 | 250 | No. 25 | 0.98 | 0.011 | 0.063 | 0.179 | 0.52 | 38 | B |
| Example 40 | PHA1000 | 350 | No. 25 | 0.72 | 0.004 | 0.064 | 0.066 | 0.30 | 40 | B |
| Example 41 | PHA1000 | 250 | No. 25 | 0.97 | 0.012 | 0.066 | 0.179 | 0.53 | 60 | C |
| Example 42 | PHA1000 | 350 | No. 25 | 0.79 | 0.005 | 0.069 | 0.070 | 0.30 | 68 | D |
| Example 43 | PHA1000 | 250 | No. 25 | 0.99 | 0.012 | 0.060 | 0.197 | 0.47 | 83 | D |
| Example 44 | PHA1000 | 350 | No. 25 | 0.57 | 0.005 | 0.065 | 0.075 | 0.30 | 55 | C |
| Example 45 | PHA1000 | 400 | No. 25 | 0.63 | 0.013 | 0.061 | 0.205 | 0.47 | 72 | D |
| Example 46 | PHA1000 | 350 | No. 25 | 0.79 | 0.005 | 0.063 | 0.079 | 0.30 | 59 | C |
| Example 47 | PHA1000 | 250 | No. 25 | 0.99 | 0.012 | 0.064 | 0.189 | 0.47 | 76 | D |
| Example 48 | PHA1000 | 250 | No. 25 | 0.99 | 0.020 | 0.109 | 0.181 | 0.33 | 35 | B |
| Comparative Example 1 | PHA4500 | 2150 | No. 25 | 1.28 | 0.002 | 0.014 | 0.163 | 0.02 | 108 | E |
| Comparative Example 2 | PHA1000 | 160 | No. 25 | 0.52 | 0.002 | 0.128 | 0.013 | 0.78 | 101 | E |
| Comparative Example 3 | PHA1000 | 10 | No. 25 | 0.54 | 0.031 | 0.000 | — | 0.77 | 132 | E |
| Comparative Example 4 | PHA1000 | 500 | No. 25 | 1.04 | 0.000 | 0.138 | 0.000 | 0.22 | 115 | E |
| Comparative Example 5 | PHA1000 | 10 | No. 25 | 0.54 | 0.039 | 0.001 | 29.049 | 0.55 | 132 | E |
| Comparative Example 6 | PHA1000 | 350 | No. 25 | 0.57 | 0.005 | 0.065 | 0.070 | 0.00 | 112 | E |

In accordance with one aspect of the present disclosure, it is possible to provide a cleaning wiper blade capable of exhibiting excellent wipability even with a weak pressing force against the to-be-cleaned surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cleaning wiper blade comprising:
a hand grip part; and
an elastic part supported by the hand grip part, and to be pressed against a to-be-cleaned surface,
a part of the elastic part being brought into contact with a surface of a to-be-cleaned member, and thereby the surface of the to-be-cleaned member being cleaned,
the elastic part comprising polyurethane,
the polyurethane comprising a reactant of a composition including an isocyanate compound and an alcohol, the isocyanate compound including diisocyanate and tri- or higher functional polyfunctional isocyanate, and the alcohol including tri- or higher functional polyfunctional alcohol, and
the diisocyanate having an aromatic ring in a molecule, wherein when the polyurethane is heated up to 1000° C. at a temperature rise rate of 10° C./s using a mass spectrometer of a direct sample injection system in which a sample is heated and vaporized in an ionization chamber, and a molecule of the sample is ionized, then obtained
a detected amount of all ions is defined as M1,
an integrated intensity of a peak in an extracted ion thermogram corresponding to a range of an m/z value derived from the tri- or higher functional polyfunctional isocyanate is defined as M2, and
an integrated intensity of a peak of an extracted ion thermogram corresponding to a range of an m/z value derived from the diisocyanate is defined as M3,
M2/M1 is 0.001 to 0.028,
M3/M1 is 0.020 to 0.110, and
M2/M3 is 0.013 to 0.300, and
a concentration of the tri- or higher functional polyfunctional alcohol in the polyurethane is 0.12 mmol/g to 0.65 mmol/g.

2. The cleaning wiper blade according to claim 1, wherein the M2/M1 is 0.001 to 0.015,
the M3/M1 is 0.040 to 0.100,
the M2/M3 is 0.013 to 0.150, and
a concentration of the tri- or higher functional polyfunctional alcohol in the polyurethane is 0.22 mmol/g to 0.39 mmol/g.

3. The cleaning wiper blade according to claim 1, wherein the diisocyanate has a structure in which NCO is directly bonded to the aromatic ring.

4. The cleaning wiper blade according to claim 1, wherein the tri- or higher functional polyfunctional isocyanate is at least one selected from the group consisting of polymeric MDI, triphenyl methane-4,4',4"-triisocyanate, and tris(phenyl isocyanate)thiophosphate.

5. The cleaning wiper blade according to claim 1, wherein the tri- or higher functional polyfunctional alcohol is at least one selected from the group consisting of alcohols expressed by following formulae (a) and (b), and glycerin and pentaerythritol:

where, (in the formula (a), $R_1$ represents H, $CH_3$, or $C_2H_5$, and where, in the formula (b), $R_2$ represents $CH_3$, or $C_2H_5$.

* * * * *